(12) United States Patent
Tessler et al.

(10) Patent No.: US 11,328,085 B2
(45) Date of Patent: May 10, 2022

(54) SECURING CONFIDENTIAL INFORMATION DURING A TELECOMMUNICATION SESSION

(71) Applicant: Capital One Services, LLC, McLean, VA (US)

(72) Inventors: Leeyat Bracha Tessler, Washington, DC (US); Kyle Johnson, Washington, DC (US); Latika Gulati, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/930,749

(22) Filed: May 13, 2020

(65) Prior Publication Data

US 2021/0357525 A1 Nov. 18, 2021

(51) Int. Cl.
*G06F 21/62* (2013.01)
*H04W 76/10* (2018.01)
*G06Q 20/22* (2012.01)
*G06Q 20/32* (2012.01)
*G06Q 20/34* (2012.01)
*G06Q 20/40* (2012.01)

(52) U.S. Cl.
CPC ....... *G06F 21/6245* (2013.01); *G06Q 20/227* (2013.01); *G06Q 20/322* (2013.01); *G06Q 20/34* (2013.01); *G06Q 20/4014* (2013.01); *H04W 76/10* (2018.02)

(58) Field of Classification Search
CPC .... G06Q 20/322; G06Q 20/40; G06Q 20/352; H04M 3/5166; H04N 7/15; G06F 21/6245

USPC ........................................................ 705/44
See application file for complete search history.

(56) References Cited

U.S. PATENT DOCUMENTS

2007/0233615 A1* 10/2007 Tumminaro ......... G06Q 20/322
                                                         705/75
2012/0323669 A1* 12/2012 Kohlmeier ............. G06Q 30/02
                                                        705/14.38

(Continued)

OTHER PUBLICATIONS

A Survey of Payment Card Industry Data Security Standard (Year: 2010).*

(Continued)

*Primary Examiner* — Bruce I Ebersman
(74) *Attorney, Agent, or Firm* — Banner & Witcoff, Ltd.

(57) ABSTRACT

Systems and methods disclosed herein securely provide confidential information associated with a user during an active voice call conducted using the user's mobile device. The confidential information may be provided by generating the information in spoken form and inserting the spoken information into an audio stream of the voice call. For example, a customer may be on a phone call with a customer agent. The customer agent may ask the customer for a credit card number in order to process a financial transaction. The customer may select the credit card number via an application executing on the customer's mobile phone. The application may cause the credit card number to be spoken out loud during the voice call. A voice sample of the spoken credit card number in inserted into the audio stream of the voice call and is therefore, audible to the customer and the customer agent without being overheard by a third party.

18 Claims, 6 Drawing Sheets

(56) References Cited

U.S. PATENT DOCUMENTS

| | | | |
|---|---|---|---|
| 2014/0379342 A1* | 12/2014 | Li | G06Q 20/40145 |
| | | | 704/246 |
| 2015/0244682 A1* | 8/2015 | Biswas | G06F 3/0481 |
| | | | 726/26 |
| 2018/0018645 A1* | 1/2018 | Rand | G06Q 20/34 |
| 2019/0158655 A1 | 5/2019 | DeLuca et al. | |
| 2019/0214018 A1* | 7/2019 | Athineos | G10L 17/00 |
| 2020/0259829 A1* | 8/2020 | Shaffer | G06F 8/61 |

OTHER PUBLICATIONS

Oct. 7, 2021—(EP) Extended European Search Report—App. No. 21173745.7.

* cited by examiner

SECURING CONFIDENTIAL INFORMATION DURING A TELECOMMUNICATION SESSION

FIELD OF USE

Aspects described herein generally relate to communication during a telecommunications session, and hardware and software related thereto. More specifically, one or more aspects describe herein secure confidential information provided during an active voice call.

BACKGROUND

Confidential information may be communicated between participants during voice calls. The confidential information may comprise any privileged information that is typically shared with only a few people, such as a social security number, a date of birth, a personal identification number, an account number, a passport number, mother's maiden name, financial or medical information, a passcode or password, a secret phrase, an answer to a security question, etc.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

People often make phone calls in public places and may need to communicate private or personal information during such calls. However, speaking the information out loud is potentially risky as a third party may overhear the spoken information and misuse it for nefarious purposes. Whispering the information may be impractical as the other party on the phone call may not clearly hear the information, for example, due to background noise in public places. In some cases, a person may have an accent that may make it difficult for the other party to understand the spoken information.

Systems and methods disclosed herein securely provide confidential information in spoken form during an active voice call. For example, a customer may be on a phone call with a customer agent. The customer agent may ask the customer for a credit card number in order to process a financial transaction. In order to securely provide the requested information, the customer may select the credit card number via an application executing on the customer's mobile phone. The application may cause the credit card number to be spoken out loud in real time during the voice call, for example by inserting a voice sample of the spoken credit card number into an audio stream of the voice call. While the inserted spoken information is audible to the customer and the customer agent, it is not audible to others that may be in close proximity to the customer. In some implementations, the requested confidential information is provided based on verifying that the customer agent is a legitimate caller, in contrast to a robo-caller or other entity that may not be authorized to request or receive confidential information associated with the customer.

According to one aspect, the disclosure relates to a computer-implemented method that includes receiving, by a first device and during an active voice call between a first participant and a second participant, a request for confidential information. The method includes determining, by the first device, one or more options associated with the requested confidential information, causing, by the first device, the one or more options to be displayed to the first participant as one or more user selectable options, receiving, by the first device, a selection of an option from the one or more options, and providing, by the first device and to the second participant, the requested confidential information by at least one of inserting a voice sample corresponding to the selected option into an audio stream of the active voice call, or sending the voice sample corresponding to the selected option to the second participant.

According to another aspect, the disclosure relates to an apparatus that includes one or more processors, and a memory storing computer-readable instructions. The computer-readable instructions, when executed by the one or more processors, cause the apparatus to verify that the second participant is authorized to receive the requested confidential information based on a phone number associated with the second participant. The computer-readable instructions, when executed by the one or more processors, also cause the apparatus to determine, based on a verification that the second participant is authorized to receive the requested confidential information, the one or more options associated with the requested confidential information, cause, during an active voice call between a first participant and a second participant, one or more options associated with confidential information to be displayed to the first participant as one or more user selectable options, and based on a selection of an option from the one or more options, insert a voice sample corresponding to the selected option into an audio stream of the active voice call. The voice sample may comprise at least one of a recording of the first participant speaking the confidential information, a computer-generated recording of the confidential information in spoke form, or information associated with the confidential information spoken in real time.

According to another aspect, the disclosure relates to non-transitory machine-readable medium storing instructions that, when executed by one or more processors, cause the one or more processors to perform steps comprising: receiving, during an active voice call between a first participant and a second participant, a request for confidential information, determining one or more options associated with the requested confidential information, wherein the confidential information comprises payment information, determining one or more options associated with the requested confidential information comprises determining one or more payment options comprising one or more credit card numbers, selecting, based on a determination that the second participant is a vendor, a first payment option from the one or more payment options, verifying that the second participant is authorized to receive the requested confidential information based on a phone number associated with the second participant, causing, based on a verification that the second participant is authorized to receive the requested confidential information the one or more options to be displayed to the first participant as one or more user selectable options, receiving a selection of an option from the one or more options, determining that the selection of the payment option was within a predetermined amount of time, wherein the predetermined amount of time is a duration between presenting the one or more payment options to the first participant and receiving the selection of the payment option, obtaining based on a determination that the selection of the payment option was within the predetermined amount of time, an audio recording corresponding to the selected option, and providing to the second participant, the requested confidential information, based on inserting the audio recording into a voice stream of the active voice call. The audio recording may comprise at least one of a recording of the first participant speaking the selected payment option, a computer-generated recording of the selected payment option, or information associated with the selected payment option in spoken form.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Figure 1:
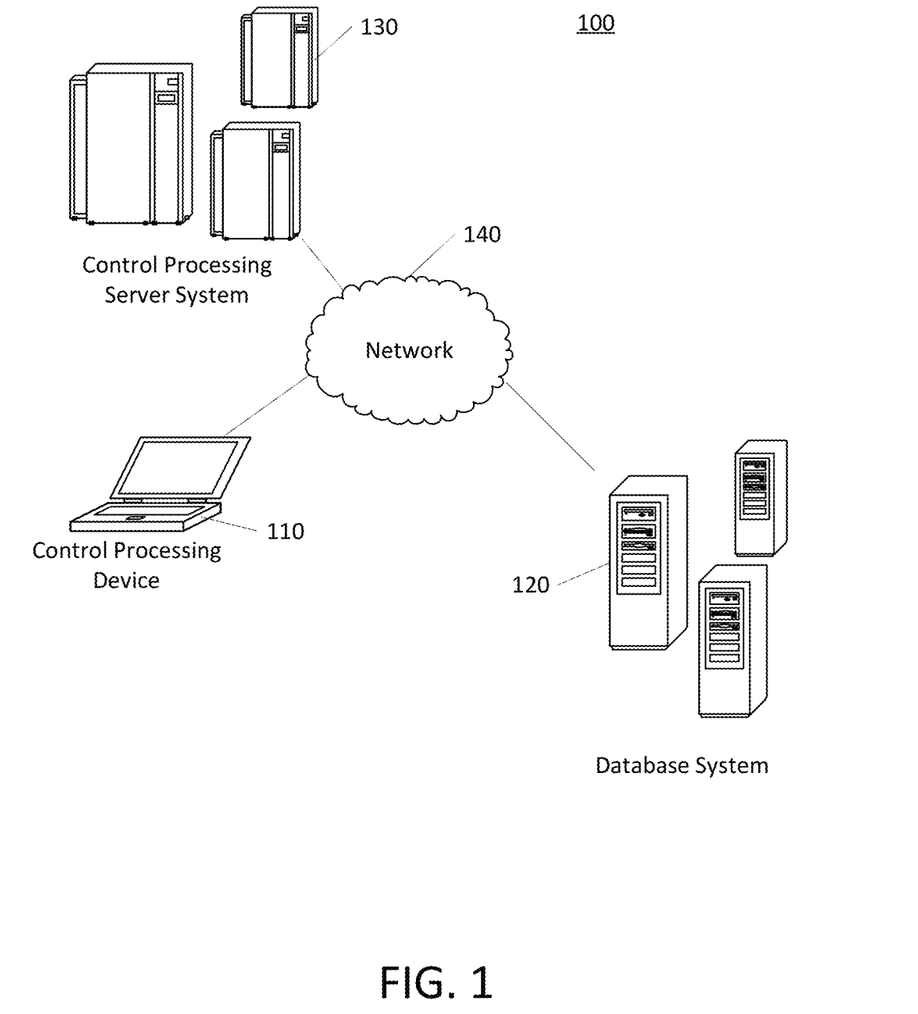
FIG. 1 shows an example of a control processing system in which one or more aspects described herein may be implemented.

FIG. 1 shows a system 100. The system 100 may include at least one client device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client device 110 may access server applications and/or resources using one or more client applications (not shown) as described herein. Client device 110 may be a mobile device, such as a laptop, smart phone, or tablet, or computing devices, such as a desktop computer or a server. Alternatively, client device 110 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 120 may be configured to maintain, store, retrieve, and update information for server system 130. Further, database system may provide server system 130 with information periodically or upon request. In this regard, database system 120 may be a distributed database capable of storing, maintaining, and updating large volumes of data across clusters of nodes. Database system 120 may provide a variety of databases including, but not limited to, relational databases, hierarchical databases, distributed databases, in-memory databases, flat file databases, XML databases, NoSQL databases, graph databases, and/or a combination thereof.

Server system 130 may be configured with a server application (not shown) that is capable of interfacing with client application and database system 120 as described herein. In this regard, server system 130 may be a stand-alone server, a corporate server, or a server located in a server farm or cloud-computer environment. According to some examples, server system 130 may be a virtual server hosted on hardware capable of supporting a plurality of virtual servers.

Network 140 may include any type of network. For example, network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
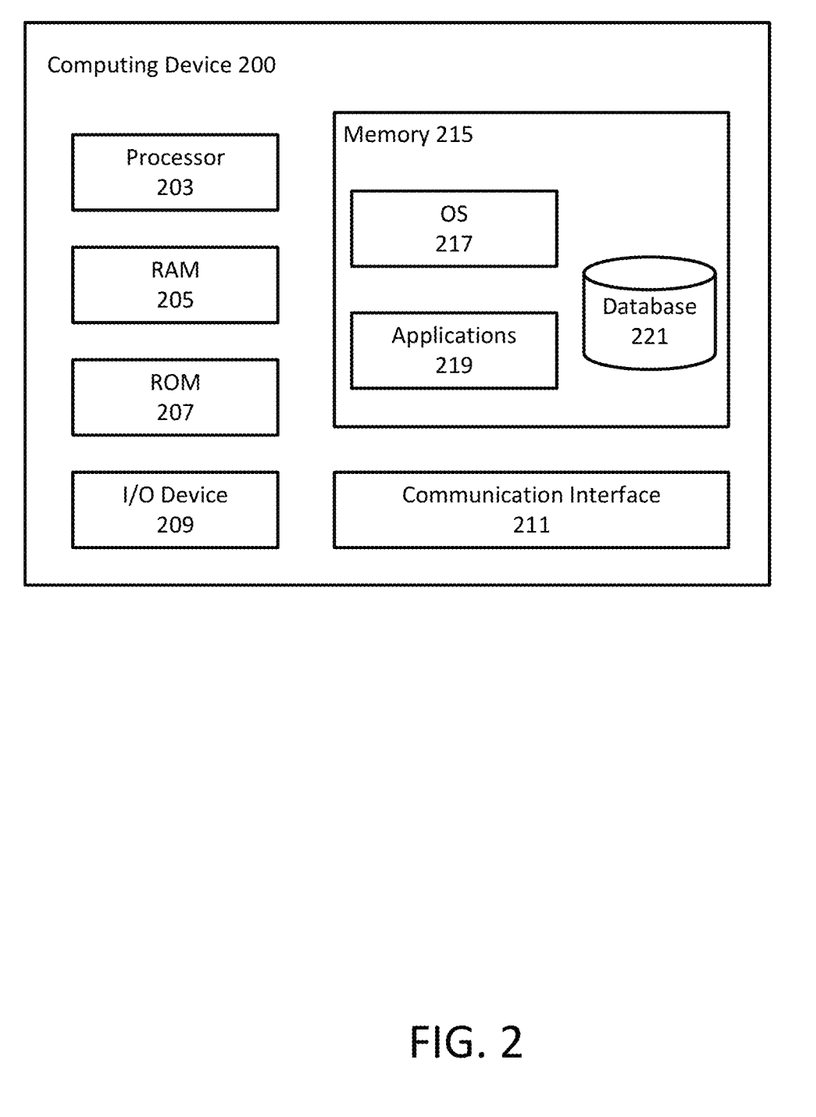
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
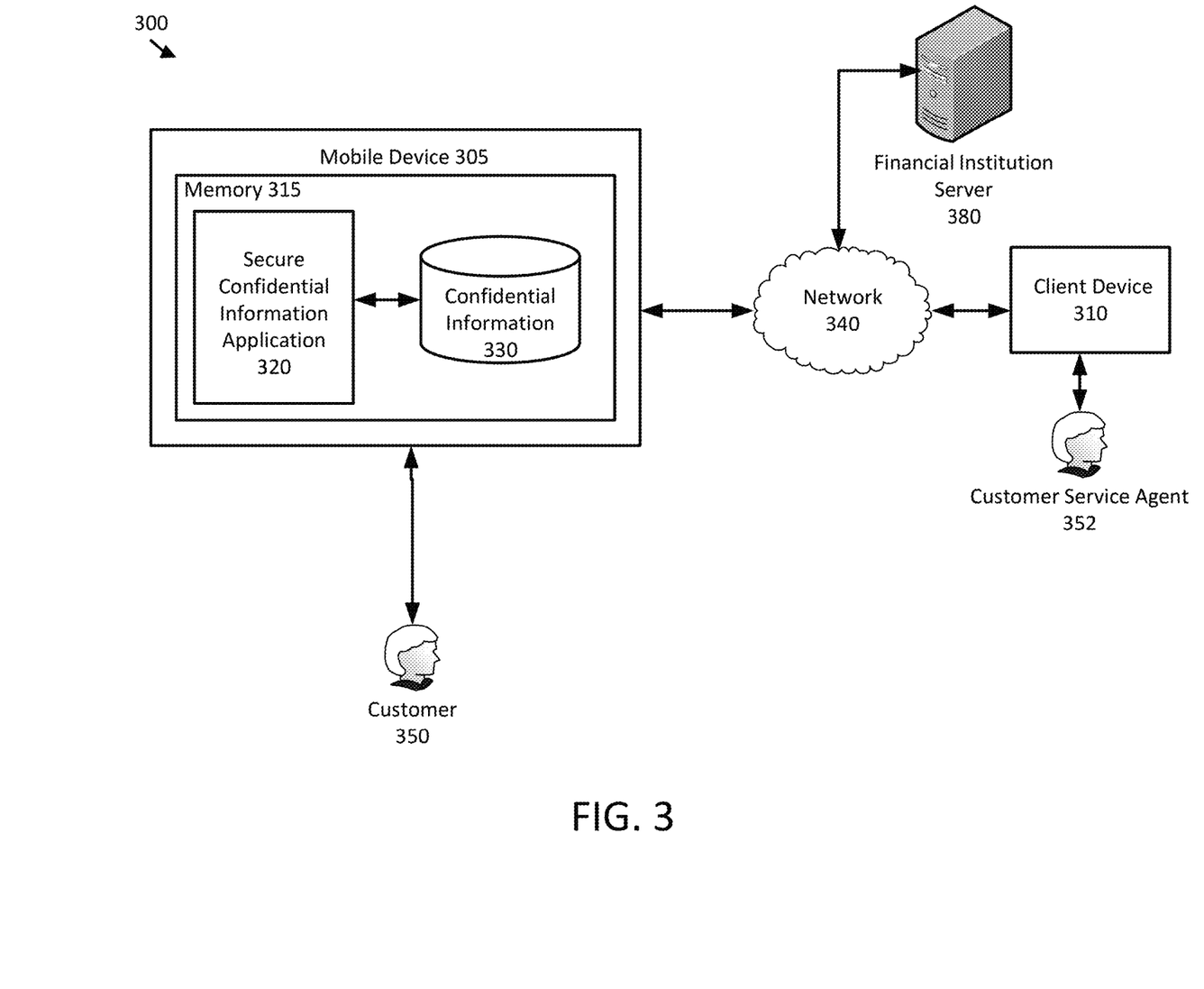
FIG. 3 shows an example system for securing confidential information during a telecommunications session.

FIG. 3 shows an example system 300 for securely providing confidential information during a telecommunications session, such as a voice call. The system 300 may comprise a mobile device 305, a client device 310, and a financial institution server 380 in communication over a network 340. The mobile device 305, the client device 310, and the financial institution server 380 may each be a computing device, such as the computing device 200 shown in FIG. 2. The mobile device 305 and the client device 310 may be configured to conduct and/or receive a voice call. A user of the mobile device 305, such as a customer 350, may communicate with a user of the client device 310, such as a customer service agent 352, over a voice call conducted between the mobile device 305 and client device 310. During the voice call, the customer service agent 352 may request the customer 350 for confidential information associated with the customer 350. The requested confidential information or personally identifiable information (PII) may comprise any privileged information that is typically shared with only a few people, such as a social security number, a date of birth, a personal identification number, an account number, a passport number, mother's maiden name, financial or medical information, a passcode or password, a secret phrase, or an answer to a security question. For example, as part of a financial transaction between the customer 350 and a merchant and/or vendor represented by the customer service agent 352, the customer 350 may be requested by the customer service agent 352 to provide payment information, such as a credit card number, a financial account number, or a virtual number. A memory 315 of the mobile device 305 may store or include one or more mobile applications, such as a secure confidential information application 320. The secure confidential information application 320 may generally be configured to securely provide confidential information during an active voice call. The customer 350 may provide the requested payment information to the customer service agent 352 via a user interface provided by the secure confidential information application 320. The memory 315 may also comprise one or more databases, shown in FIG. 3 as confidential information 330. The confidential information 330 may comprise any privileged and/or private information and/or PII associated with the customer 350. The secure confidential information application 320 may interface with the confidential information 330 to determine or identify the requested information. The secure confidential information application 320 may provide the requested information to the customer service agent 352 by causing the information to be spoken in real time. Specifically, a voice sample corresponding to the information in spoken form may be inserted into an audio stream of the active voice call. The customer 350 does not enunciate the information and the mobile device 305 does not play and/or otherwise reproduce the information. In this manner, the requested confidential information or PII is provided to the customer service agent 352 without the customer 350 having to speak the information during the voice call and thereby risk being overheard by a third party.

Figure 4A:
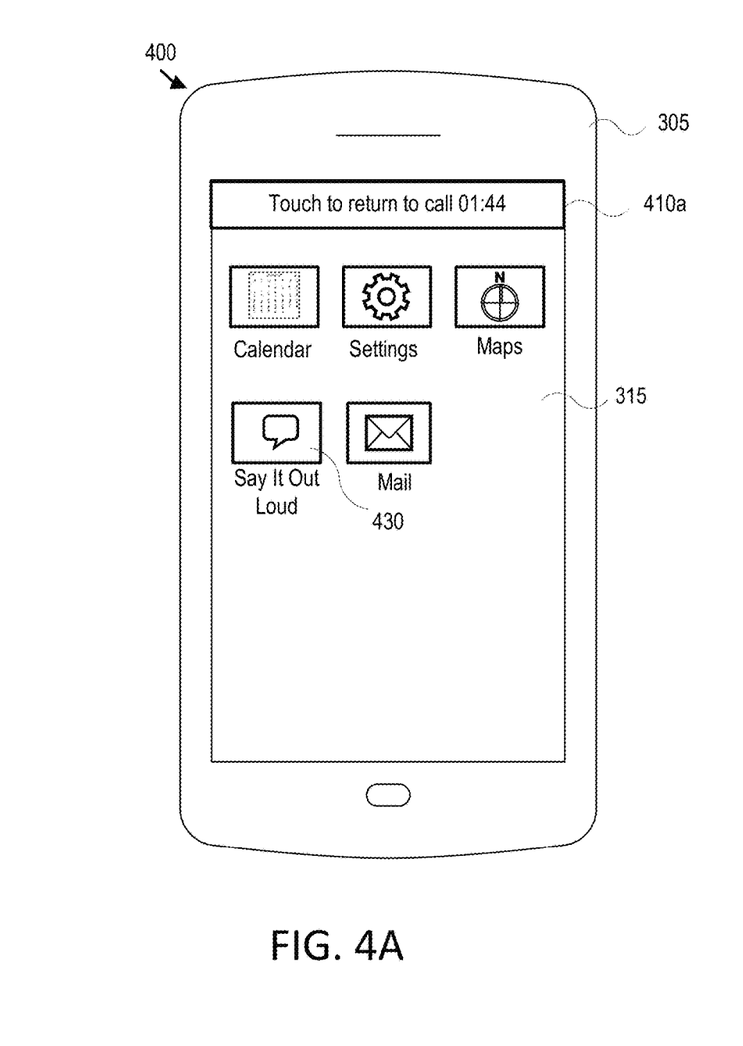
FIG. 4A shows an example of a startup icon of a mobile application that securely provides confidential information during a voice call.

The secure confidential information application 320 may provide an application user interface that may be accessed by the customer 350 via a display of the mobile device 305. FIG. 4A is an example display 315 of the mobile device 305 showing several startup application icons, such as a calendar application icon, a settings icon, a maps application icon, an email application icon, and a "Say It Out Loud" application icon 430. The user interface provided by the secure confidential information application 320 may be accessed by the customer 350 by selecting the "Say It Out Loud" application icon 430.

Based on detecting a selection of the "Say It Out Loud" application icon 430, the secure confidential information application 320 may determine whether the mobile device 305 is currently engaged in an active voice call. In order to safeguard the confidential information 330 from unauthorized access, the secure confidential information application 320 may not allow the customer 350 to access the user interface of the "Say It Out Loud" application when the mobile device 305 is not engaged in an active voice call. As shown in FIG. 4A, a portion of the display may comprise an indication 410a that the mobile device 305 is currently engaged in an active voice call.

Additionally, in some implementations, the secure confidential information application 320 may verify that the "Say It Out Loud" application is being accessed by the owner of the mobile device 305 and not an unauthorized third party. For example, the secure confidential information application 320 may request the customer 350 to provide a password and/or biometric data. If the secure confidential information application 320 is unable to verify the customer 350, the customer 350 may not be able to access any of the confidential information 330 in the user interface of the "Say It Out Loud" application.

Figure 4B:
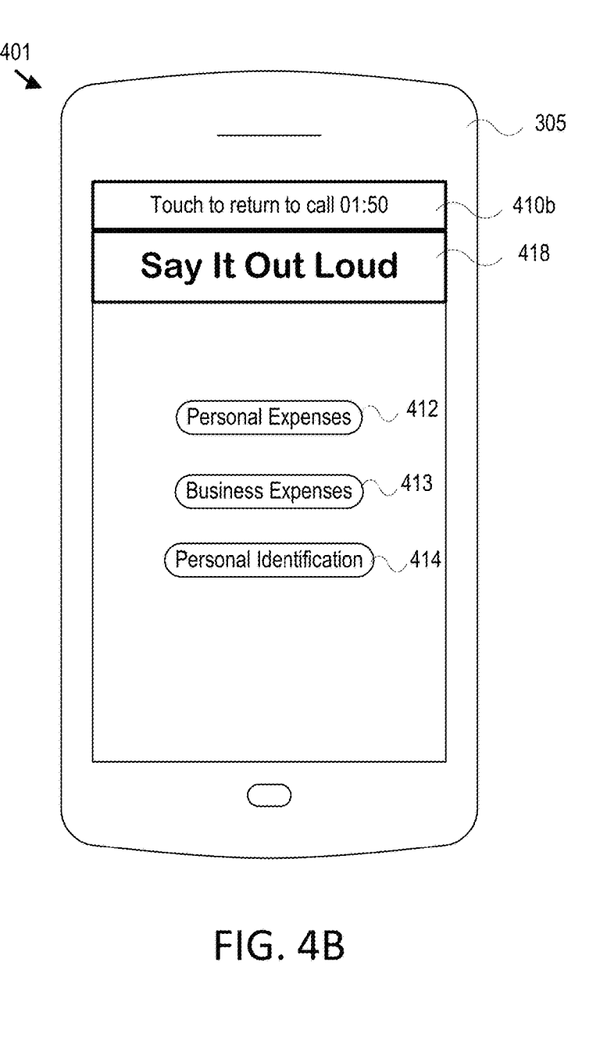
FIG. 4B shows an example of categories of confidential information.

Based on determining that the "Say It Out Loud" application is being accessed while the mobile device 305 is engaged in an active voice call, the secure confidential information application 320 displays the user interface for the "Say It Out Loud" application in a display of the mobile device 305. FIG. 4B is an example of a user interface 400 of the "Say It Out Loud" application. As shown in FIG. 4B, a portion of the display may comprise an indication 410b that the mobile device 305 is currently engaged in an active voice call. As shown in FIG. 4B, the user interface of the "Say It Out Loud" application may display various categories of the confidential information 330, such as "Personal Expenses" 412, "Business Expenses" 413, and "Personal Identification" 414. The category "Personal Expenses" 412 may include confidential information 330, such as credit cards and/or virtual numbers that the customer 350 may have pre-selected for payment of personal expenses or that the customer 350 may have used in the past to pay for personal expenses. The category "Business Expenses" 413 may include confidential information 330, such as business credit cards and/or virtual numbers that the customer 350 may have used in the past to pay for business related expenses, such as airfare, hotels, etc. The category "Personal Identification" 413 may include confidential information 330, such as a mother's maiden name, social security number, passwords, etc. The categories may be user specified or may be determined based on evaluating a transaction history of the customer 350. For example, the evaluating of the transaction history of the customer 350 may be performed by the financial institution server 380 and the results of the evaluation may be sent to the mobile device 305 on weekly, monthly, or quarterly basis. The customer 350 may select one of the categories 412, 413, or 414 displayed in the user interface.

The secure confidential information application 320 may determine and/or identify the confidential information 330 associated with a selected category. For example, based on the customer 350 selecting the "Personal Expenses" category 412, the secure confidential information application 320 may determine and/or identify credit cards and/or virtual numbers that the customer 350 may have pre-selected for payment of personal expenses or that the customer 350 may have used in the past to pay for personal expenses.

The secure confidential information application 320 may verify the customer service agent 352 in order to determine whether the customer service agent 352 is authorized to receive the confidential information 330 associated with the selected "Personal Expenses" category 412. The secure confidential information application 320 may verify the customer service agent 352 based on a phone number associated with the client device 310. The verifying of the customer service agent 352 may be based on pre-verified phone numbers compiled by, for example, a financial institution, a government entity, a customer protection entity, and/or an employer.

In some implementations, the secure confidential information application 320 may, based on verifying the customer service agent 352, further evaluate the relevant confidential information. For example, if the phone number of the customer service agent 352 is determined to be associated with a travel agent, then the secure confidential information application 320 may, based on evaluating the transaction history of the customer 350, determine that the customer 350 has in the past frequently used a specific credit card for travel related purchases. This credit card may be given a higher ranking than, for example, a credit card that was never or occasionally used for travel related purchases. In some implementations, the secure confidential information application 320 may evaluate the transaction history of the customer 350 by interfacing with the financial institution server shown in FIG. 3.

Figure 4C:
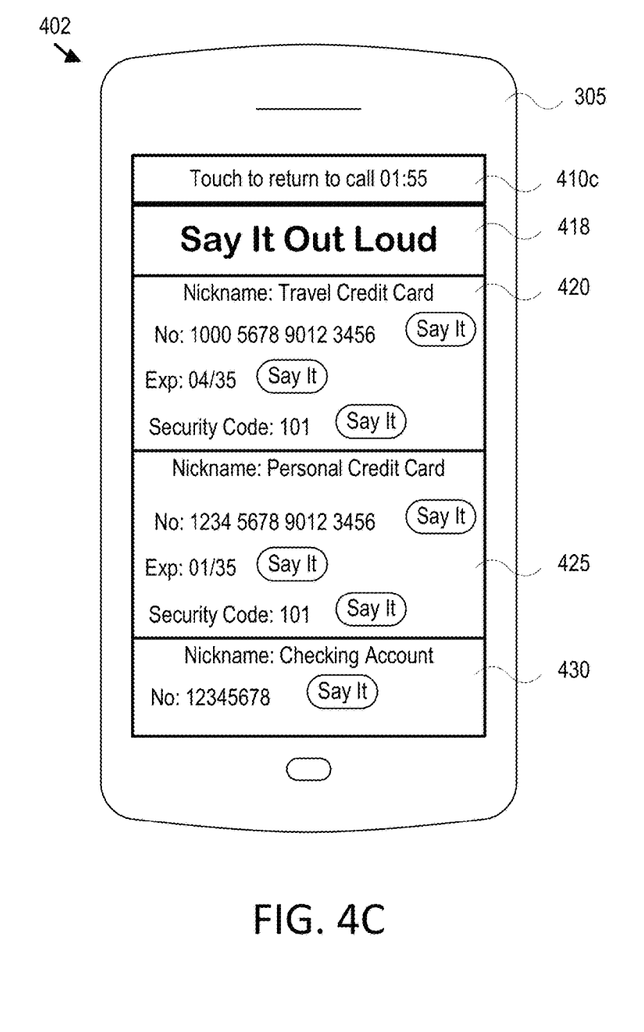
FIG. 4C shows an example of a user interface provided by a mobile application that securely provides confidential information during a voice call.

Based on determining that the customer service agent 352 is authorized, the secure confidential information application 320 may display the confidential information 330 associated with the selected "Personal Expenses" category 412. FIG. 4C shows an example user interface 403 of the "Say It Out Loud" application displaying the confidential information 330 associated with the selected "Personal Expenses" category 412. As shown in FIG. 4C, a portion of the display 315 may comprise an indication 410c that the mobile device 305 is currently engaged in an active voice call. Information related to first credit card 420 associated with the selected "Personal Expenses" category 412 may be displayed in the user interface. The displayed information may include a user given identification or nickname for the credit card, such as "Travel Credit Card," the card number, the expiration date, and/or the security code. The user interface may also include a user selectable button "Say It" next to each of the card number, the expiration date, and/or the security code. The customer 350 may provide each of the card number, the expiration date, and/or the security code separately by selecting the corresponding "Say It" button. Also displayed in the user interface shown in FIG. 4C is information for a second credit card 425. The displayed information includes a user given identification or nickname for the second credit card 425, such as "Personal Credit Card," the card number, the expiration date, and the security code. A user selectable button "Say It" may be displayed next to each of the card number, the expiration date and the security code. The user interface shown in FIG. 4C also displays information for a bank account 430. The displayed information includes a user given identification or nickname for the bank account, such as "Checking Account," and the account number. A user selectable button "Say It" may be displayed next to the account number. While FIG. 4C shows some example configurations for displaying confidential information, the confidential information may be displayed according to a variety of other configurations and may include other user selectable options. As another example, the user interface may not display details for the confidential information. A "Say It" button may indicate that it corresponds to the card number. However, the card number itself may not be displayed.

As an example, the customer 350 may provide the "Personal Credit Card" 425 to the customer service agent 352 by selecting the "Say It" button corresponding to the credit card number. The secure confidential information application 320 may determine whether the customer 350 selected the "Say It" button corresponding to the credit card number within a threshold amount of time. The threshold amount of time may be a duration of time between presenting the confidential information to the customer 350 and receiving a selection. In some implementations, if the customer 350 does not select to provide any information within a threshold amount of time, the secure confidential information application 320 may remove the confidential information from being displayed in the user interface. This reduces the risk of the displayed confidential information from being discovered in case the customer 350 does not use any of the displayed confidential information. In some implementations, if the customer 350 does not make a selection within a threshold amount of time, the secure confidential information application 320 may display a message or alert in the user interface before removing the display of the confidential information.

In the example described above, based on the customer 350 selecting the "Say It" button corresponding to the card number of the second credit card 425, the secure confidential information application 320 may cause the selected information to be spoken in real time. The secure confidential information application 320 may insert a voice sample corresponding to the credit card number in spoken form into an audio stream of the active voice call. The customer 350 does not enunciate the information and the spoken information is not played and/or reproduced by the mobile device 305. In some implementations, the voice sample may be based on a computer-generated recording of the confidential information in spoken form. Thus, when the customer selects the "Say It" button corresponding to the card number of the second credit card 425, a computer-generated voice may speak the card number "1234 5678 9012 3456." The computer-generated voice will be audible to the customer service agent 352. However, since the customer 350 did not speak the card number, the card number will not be audible to people in close physical proximity to the user and the mobile device 305 may not play and/or reproduce the card number such that it may be heard by people proximately located to the user. The customer 350 may provide the expiration date and/or the security code of the second credit card 425 by selecting their corresponding "Say It" buttons. In some implementations, the gender, accent, and other characteristics of the computer-generated voice may be user defined.

Figure 5:
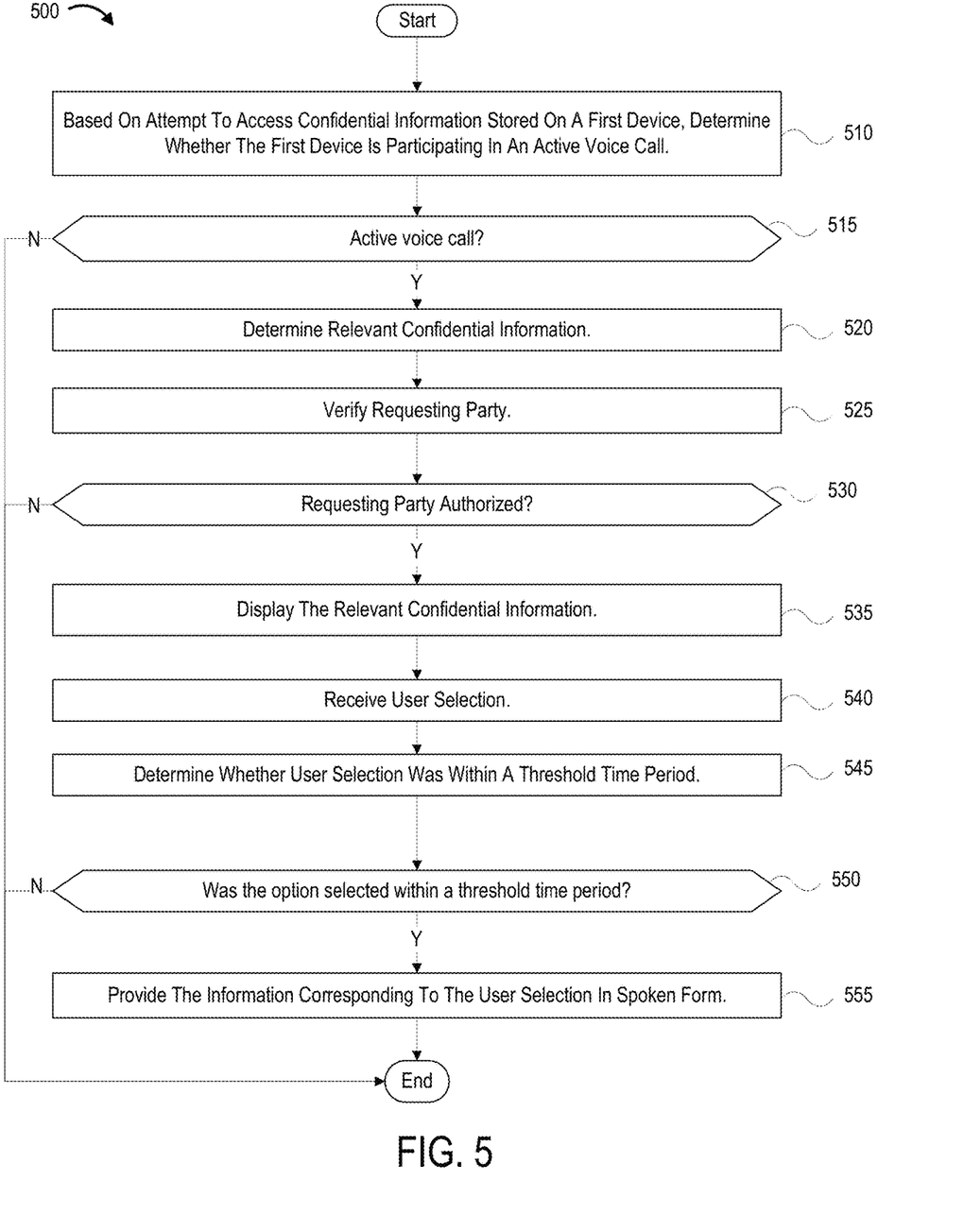
FIG. 5 shows a flow diagram of an example method for securing confidential information during a voice call.

FIG. 5 is a flow diagram of an example method 500 for securing confidential information during a telecommunications session performed by the secure confidential information application 320 executing on the mobile device 305. Alternatively or additionally, some or all of the steps of the method 500 may be performed by one or more other computing devices. The steps of the method 500 may be modified, omitted, and/or performed in other orders, and/or other steps added.

As discussed above with respect to FIGS. 3 and 4A, a customer may communication with a customer service agent via a phone call. During the phone call, the customer service agent may request confidential information from the customer. The customer may launch the "Say It Out Loud" application, for example, based on or in response to the customer service agent's request for confidential information. Upon launching the application, the secure confidential application may determine whether the mobile device is engaged (e.g., participating) in an active voice call at step 510.

At step 510, a computing device (e.g. the secure confidential information application 320 executing on the mobile device 305) may determine whether the mobile device 305 is engaged in an active voice call. At step 515, based on determining that the customer 350 is attempting to access the confidential information when the mobile device 305 is not participating in an active voice call, the secure confidential information application 320 may not open the "Say It Out Loud" application. However, at step 515, based on a determination that the mobile device 305 is participating in an active voice call, the secure confidential information application 320 may proceed to step 520.

At step 520, a computing device (e.g. the secure confidential information application 320 executing on the mobile device 305) may display one of the interfaces discussed above with respect to FIGS. 4A-4C. In particular, the secure confidential information application may display user interface 410 as shown in FIG. 4B to allow the user to select one of the categories of confidential information (e.g., "Personal Expenses" 412, "Business Expenses" 413, and "Personal Identification" 414). For instance, the secure confidential information application 320 may determine or identify credit cards or virtual numbers that the customer 350 may have pre-selected for payment of personal expenses or that the customer 350 may have used in the past to pay for personal expenses, for example, based on the customer selecting the "Personal Expenses" category 412.

At step 525, a computing device (e.g. the secure confidential information application 320 executing on the mobile device 305) may verify the customer service agent 352 in order to determine whether the customer service agent 352 is authorized to receive the confidential information 330. The secure confidential information application 320 may verify the customer service agent 352 based on a phone number associated with the client device 310. The verifying of the customer service agent 352 may be based on pre-verified phone numbers compiled by, for example, a financial institution, a government entity, a customer protection entity, and/or an employer. In some implementations, the secure confidential information application 320 may, based on verifying the customer service agent 352, further evaluate the relevant confidential information. For example, if the phone number of the customer service agent 352 is determined to be associated with a travel agent, then the secure confidential information application 320 may, based on evaluating the transaction history of the customer 350, determine that the customer 350 has in the past frequently used a specific credit card for travel related purchases. This credit card may be given a higher ranking than, for example, a credit card that was never used for travel related purchases. In some implementations, the secure confidential information application 320 may evaluate the transaction history of the customer 350 by interfacing with the financial institution server 380.

At step 530, a computing device (e.g. the secure confidential information application 320 executing on the mobile device 305) may, based on a determination that the customer service agent 352 is not authorized to receive the requested confidential information, close the "Say It Out Loud" application, thereby preventing further access to the confidential information. However, at step 535, a computing device (e.g. the secure confidential information application 320 executing on the mobile device 305) may, based on a determination that the customer service agent 352 is authorized to receive the requested confidential information, proceed to step 535.

At step 535, a computing device (e.g. the secure confidential information application 320 executing on the mobile device 305) may, based on determining that the customer service agent 352 is authorized, display one of the interfaces discussed above with respect to FIGS. 4A-4C. In particular, the secure confidential information application may display user interface 403 as shown in FIG. 4C. The display 315 may comprise an indication 418a that the mobile device 305 is currently engaged in an active voice call. Information for a first credit card 420 associated with the selected "Personal Expenses" category 412 may be displayed and may include a user given identification or nickname for the credit card, such as "Travel Credit Card," the card number, the expiration date, and the security code. A user selectable button "Say It" next to each of the card number, the expiration date and the security code. The customer 350 may provide each of the card number, the expiration date and the security code separately by selecting the corresponding "Say It" button. Similarly, information for a second credit card 425 may be displayed. Information for a bank account 430 may include a user given identification or nickname for the bank account, such as "Checking Account," and the account number. A user selectable button "Say It" may be displayed next to the account number. While FIG. 4C shows some example configurations, the confidential information may be displayed according to a variety of other configurations and may include other user selectable options. As another example, the user interface 403 may not display details for the confidential information. A "Say It" button may indicate that it corresponds to the card number. However, the card number itself may not be displayed.

At step 540, a computing device (e.g. the secure confidential information application 320 executing on the mobile device 305) may receive a user selection of one of the displayed options. As an example, the customer 350 may provide the "Personal Credit Card" 425 to the customer service agent 352 by selecting the "Say It" button corresponding to the credit card number.

At step 545, a computing device (e.g. the secure confidential information application 320 executing on the mobile device 305) may determine whether the customer 350 selected the "Say It" button corresponding to the credit card number within a threshold amount of time. The threshold amount of time may be a duration of time between presenting the confidential information to the customer 350 and receiving a selection.

At step 550, a computing device (e.g. the secure confidential information application 320 executing on the mobile device 305) may close the user interface or continue to display the user interface with limited information, for example, based on or in response to a determination that the customer 350 did not select a displayed option within a threshold time period. In some implementations, if the customer 350 does not select to provide any information within a threshold amount of time, the secure confidential information application 320 may remove the confidential information from being displayed in the user interface. This reduces the risk of the displayed confidential information from being discovered in case the customer 350 does not use any of the displayed confidential information. In some implementations, if the customer 350 does not make a selection within a threshold amount of time, the secure confidential information application 320 may display a message and/or alert in the user interface before removing the display of the confidential information. However, at step 550, based on a determination that the customer 350 selected the option within a threshold time period, the secure confidential information application may proceed to step 555.

At step 555, a computing device (e.g. the secure confidential information application 320 executing on the mobile device 305) may cause the selected information to be spoken in real time. In the example described above, based on the customer 350 selecting the "Say It" button corresponding to the card number of the second credit card 425, the secure confidential information application 320 may cause the selected information to be spoken in real time. The secure confidential information application 320 may insert a voice sample corresponding to the confidential information (e.g. credit card number) in spoken form into an audio stream of the active voice call. The customer 350 does not enunciate the information and the information is not played and/or otherwise reproduced by the mobile device 305. In some implementations, the voice sample may be based on a computer-generated recording of the confidential information in spoken form. Additionally or alternatively, the voice sample may be a user recording of the confidential information. Thus, when the customer selects the "Say It" button corresponding to the card number of the second credit card 425, a computer-generated voice may speak the card number "1234 5678 9012 3456." The computer-generated voice may be audible to the customer service agent 352. However, since the customer 350 did not speak the card number, the card number may not be audible to persons in close physical proximity to the user. The customer 350 may provide the expiration date and/or the security code of the second credit card 425 by selecting their corresponding "Say It" buttons. In some implementations, the gender, accent, and/or other characteristics of the computer-generated voice may be user defined.

The method and systems herein improve the security of sharing confidential information during a phone call by providing the recipient (e.g., customer service agent) with confidential information without having the customer enunciate the confidential information and/or the mobile device play and/or reproduce the confidential information. This improves security by preventing the inadvertent disclosure of confidential information to malicious third parties and/or eavesdroppers.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
    receiving, by a first device and during an active voice call between a first participant and a second participant, a request for confidential information, wherein the confidential information comprises payment information;
    verifying, by the first device, whether the second participant is authorized to receive the requested confidential information;
    determining, by the first device and based on a verification that the second participant is authorized to receive the requested confidential information, one or more payment options associated with the requested confidential information, wherein the one or more payment options comprise a virtual account number assigned to a vendor based on a determination that the second participant is the vendor;
    causing, by the first device, the one or more payment options associated with the requested confidential information to be displayed to the first participant as one or more user selectable options;
    receiving, by the first device, a selection of an option from the one or more payment options;
    determining, by the first device, whether the selection of an option was within a threshold period of time; and
    providing, by the first device to the second participant and based on a determination that the selection of an option was within the threshold period of time, the requested confidential information by inserting a voice sample corresponding to the selected option into an audio stream of the active voice call, wherein the voice sample corresponding to the selected option comprises the virtual account number.

2. The computer-implemented method of claim 1, wherein verifying whether the second participant is authorized to receive the requested confidential information is based on a phone number associated with the second participant.

3. The computer-implemented method of claim 1, wherein the one or more payment options comprise one or more credit card numbers.

4. The computer-implemented method of claim 1, wherein the confidential information comprises at least one of:
    a social security number of the first participant, a date of birth of the first participant, a personal identification number, a passcode, a phrase, or an answer to a security question.

5. The computer-implemented method of claim 1, wherein determining one or more payment options further comprises:
    receiving, based on a determination that the second participant is a vendor, a second selection of a first payment option from the one or more payment options.

6. The computer-implemented method of claim 1, wherein the threshold period of time is a duration between causing the one or more options to be displayed and receiving the selection of the option.

7. The computer-implemented method of claim 1, wherein the audio recording comprises at least one of:
    a recording of the first participant speaking the option;
    a computer-generated recording of the option; or
    information associated with the option in spoken form.

8. The computer-implemented method of claim 1, further comprising:
    transmitting, by the first device to a second device associated with the second participant, the selected option.

9. The computer-implemented method of claim 1, wherein the first participant does not enunciate the selected option and the audio recording is not reproduced by the first device.

10. The method of claim 1, further comprising:
    receiving, by the first device, a second request for confidential information;
    causing, by the first device, one or more second options associated with the second request to be displayed to the first participant as one or more second user selectable options; and
    based on a determination that a selection of the one or more second user selectable options was not received within the threshold period of time, causing an alert to be displayed by the first device.

11. An apparatus, comprising:
    one or more processors; and
    memory storing instructions that, when executed by the one or more processors, cause the apparatus to:

verify that a second participant is authorized to receive requested confidential information based on a phone number associated with the second participant, wherein the confidential information comprises payment information;

determine, based on a verification that the second participant is authorized to receive the requested confidential information, one or more payment options associated with the requested confidential information, wherein the one or more payment options comprise a virtual account number assigned to a vendor based on a determination that the second participant is the vendor;

cause, during an active voice call between a first participant and the second participant, the one or more payment options associated with the requested confidential information to be displayed to the first participant as one or more user selectable options;

receive a selection of an option from the one or more user selection options; and based on a determination that the selection of the option was within a threshold period of time, insert a voice sample corresponding to the selection of the option into an audio stream of the active voice call, wherein the voice sample comprises at least one of:
  a computer-generated recording of the requested confidential information in spoken form; or
  information associated with the requested confidential information spoken in real time, wherein the information associated with the requested confidential information comprises the virtual account number.

12. The apparatus of claim 11, wherein the requested confidential information comprises payment information, and the one or more user selectable options associated with the requested confidential information comprises one or more payment options.

13. The apparatus of claim 12, wherein the one or more payment options comprise one or more credit card numbers.

14. The apparatus of claim 11, wherein the requested confidential information comprises a social security number of the first participant.

15. The apparatus of claim 11, wherein the threshold period of time is a duration between causing the one or more options to be displayed and receiving the selection of the option.

16. The apparatus of claim 11, wherein the first participant does not enunciate the selection and the audio recording is not reproduced by the apparatus.

17. A non-transitory machine-readable medium storing instructions that, when executed by one or more processors, cause the one or more processors to perform steps comprising:

receiving, during an active voice call between a first participant and a second participant, a request for confidential information, wherein the confidential information comprises payment information;

determining one or more options associated with the requested confidential information, wherein the one or more comprises one or more credit card numbers when the requested confidential information comprises a request for payment information, wherein the one or more credit card numbers comprise a virtual account number assigned to a vendor based on a determination that the second participant is the vendor;

verifying that the second participant is authorized to receive the requested confidential information based on a phone number associated with the second participant;

causing, based on a verification that the second participant is authorized to receive the requested confidential information, the one or more options to be displayed to the first participant as one or more user selectable options;

receiving a selection of an option from the one or more user selectable options;

determining that the selection of the option was within a predetermined amount of time, wherein the predetermined amount of time is a duration between presenting the one or more options to the first participant and receiving the selection of the option;

obtaining, based on a determination that the selection of the option was within the predetermined amount of time, an audio recording corresponding to the selection; and providing, to the second participant, the requested confidential information by inserting the audio recording into a voice stream of the active voice call, wherein the audio recording comprises at least one of a computer-generated recording of the selection, or information associated with the selection in spoken form, wherein the audio recording comprises the virtual account number.

18. The non-transitory machine-readable medium of claim 17, wherein the first participant does not enunciate the selection and the audio recording is not reproduced by the one or more processors.

* * * * *

UNITED STATES PATENT AND TRADEMARK OFFICE
CERTIFICATE OF CORRECTION

Page 1 of 2

PATENT NO. : 11,328,085 B2
APPLICATION NO. : 15/930749
DATED : May 10, 2022
INVENTOR(S) : Leeyat Bracha Tessler et al.

It is certified that error appears in the above-identified patent and that said Letters Patent is hereby corrected as shown below:

In the Drawings

Figure 4A:
Please delete "315" and insert --405--

Figure 4B:
Please delete "418 and associated connector"

Figure 4C:
Please delete "430" and insert --435--

Figure 4C:
Please delete "418 and associated connector"

In the Specification

Detailed Description, Column 7, Line 20:
Delete "350 via a display" and insert --350 via a user interface 400--

Detailed Description, Column 7, Line 21:
Delete "display 315" and insert --display 405--

Detailed Description, Column 7, Line 57:
Delete "interface 400" and insert --interface 401--

Detailed Description, Column 8, Line 60:
Delete "interface 403" and insert --interface 402--

Detailed Description, Column 8, Line 63:
After display, delete "315"

Signed and Sealed this
Fifth Day of September, 2023

Katherine Kelly Vidal
*Director of the United States Patent and Trademark Office*

CERTIFICATE OF CORRECTION (continued)
U.S. Pat. No. 11,328,085 B2

Detailed Description, Column 9, Line 18:
Delete "account 430." and insert --account 435.--

Detailed Description, Column 11, Line 27:
Delete "step 535" and insert --step 530--

Detailed Description, Column 11, Line 38:
Delete "interface 403" and insert --interface 402--

Detailed Description, Column 11, Line 38:
After display, delete "315"

Detailed Description, Column 11, Line 39:
Delete "indication 418$a$" and insert --indication 410$c$--

Detailed Description, Column 11, Line 51:
Delete "account 430" and insert --account 435--